Nov. 18, 1930.  F. L. ARENSBERG ET AL  1,782,023

REFRACTORY STRUCTURE

Filed Feb. 8, 1929

INVENTOR
Francis L. Arensberg
Arthur J. Jacquemin
by Byrnes, Stebbins & Parmelee
their attorneys Patented Nov. 18, 1930

1,782,023

UNITED STATES PATENT OFFICE

FRANCIS L. ARENSBERG, OF PITTSBURGH, AND ARTHUR J. JACKMAN, OF FOREST HILLS, PENNSYLVANIA, ASSIGNORS TO VESUVIUS CRUCIBLE COMPANY, OF SWISSVALE, PENNSYLVANIA, A CORPORATION OF PENNSYLVANIA

REFRACTORY STRUCTURE

Application filed February 8, 1929. Serial No. 338,459.

This invention relates to refractory structures, and more particularly to refractory structures for use in furnace linings. It relates still more particularly to a composite refractory brick for furnace linings.

Refractory brick such as silica brick, fire clay brick, chrome brick, etc., are used extensively for furnace linings of various types. It is common knowledge that refractory brick of this kind when subjected to long exposure to heat or to intermittent heating and cooling, break off and spall at their faces which are exposed to the heat of the interior of the furnace. The brick usually break off or spall along planes which are generally parallel to their exposed faces.

Spalling has been attributed to various causes such as to thermal stresses and to physical changes in structure which occur in heating, such, for example, as the change in crystalline structure of a silica brick from quartz to cristobalite, when exposed to high heat for a considerable period of time. The bricks when built into a furnace lining, such as that of a furnace wall or roof, are laid side by side so that one face is exposed to the heat of the interior of the furnace.

Refractory brick of the kind referred to above have relatively poor heat conducting capacity, so that there is a relatively steep temperature gradient from the face of the brick into its body. Since the brick are built into a wall or roof, the isothermal planes in a brick are substantially parallel to its exposed face. In spalling, the cleavage planes in general tend to run along the direction of the isothermal planes, permitting the exposed face of the brick to spall or break off. The changes in crystalline structure in the brick take place from the face of the brick back into its body. When a change in the crystalline structure takes place, as, for example, the change from quartz to cristobalite in silica brick, the change begins at the face of the brick and progresses in toward its body so that the plane or planes which define the border line between the advancing crystalline change and the body of the brick will lie substantially as do the isothermal planes,—that is, generally parallel to the face of the brick. These planes of demarkation between the crystalline materials of different character tend to form a cleavage plane along which the spalling or cracking tends to occur.

In the copending application of Arthur J. Jackman and Charles L. Jones, Serial No. 281,636, filed May 31, 1928, it is disclosed that the spalling of refractory brick may be prevented or minimized when the brick are used for furnace linings by forming a composite brick in which a refractory nonmetallic element of relatively good heat conducting material is combined with the body of the brick which is of relatively poor heat conducting material.

In the said application Serial No. 281,636, a refractory structure is disclosed in which the heat conducting elements are made in the form of rods which lie in a direction generally normal to the exposed surface of the brick so as to conduct the heat from the exposed surface into the body of the brick and into the furnace wall. These heat conducting rods serve to conduct and diffuse the heat into the body of the brick and flatten out the temperature gradient which would otherwise be steep in the material of the brick near its exposed face. They therefore minimize the thermal stresses. The conducting rods also change the shape of the isothermal planes from flat planes lying parallel to the exposed face of the brick into generally conical surfaces surrounding the rods. Since the cleavage planes due to thermal stresses and to changes in crystalline structure lie along isothermal planes, these cleavage planes are likewise changed from flat planes parallel to and near the exposed faces of the brick into planes of a generally conical shape surrounding the rods and extending well into the body of the brick. Therefore if cracking should occur along such planes, there is less liability of the falling away of the material, since a piece of material of generally conical shape which extends well into the body of the brick will resist separation and spalling off much better than a plate of such material having a cleavage plane behind it parallel to and near the exposed face of the brick.

The present invention is in the nature of an improvement over that disclosed in the said application Serial No. 281,636. It aims to provide a refractory structure and a refractory brick even more resistant to spalling and also having greater structural strength. We provide a refractory structure comprising materials of different degrees of susceptibility to spalling, one face of the structure being predominantly of material of relatively less susceptibility to spalling, the ratio of such material to material of relatively greater susceptibility to spalling decreasing progressively in the direction of the depth of the structure. We further provide a composite brick comprising portions of different thermal conductivities joined along a surface extending generally diagonally of the brick.

We have found that the tendency toward spalling is greatly reduced when a composite structure is provided having its inner face composed predominantly, and preferably substantially entirely, of a material having a greater thermal conductivity or less susceptibility to spalling than the material making up the remainder of the body of the structure. When the inner face of the structure is composed predominantly of such a material, the material having the greater susceptibility to spalling is exposed very little, if at all, to the heat of the interior of the furnace. Furthermore, the material which is most likely to spall is protected and positively held in the structure by a layer of the material having less susceptibility to spalling so that it is necessary for such outer protective layer to be first disintegrated or spalled before it is possible for any of the backing material to drop off.

The surface of juncture between the respective portions of the composite structure extends through the structure generally at an angle to its surface. The isothermal planes are therefore irregularly arranged with respect to the surface of the structure, greatly reducing the inherent tendency toward spalling. Not only is the natural tendency toward cleavage less, but on account of the positive protection of the outer layer of material having less susceptibility to spalling, the possibility of pieces of the backing material dropping off into the furnace is remote until the protective layer has first been removed.

The structure herein disclosed has a further advantage in that portions of the material of less susceptibility to spalling, which material is also generally of greater structural strength, may extend from top to bottom of the structure to provide, in effect, supporting columns. This is impossible when rods are provided which extend into the structure generally normal to its inner face. The structure provided is much less expensive than one composed entirely of high-priced non-spalling refractory brick, and furthermore has the advantage that it is insulated to an appreciable extent by the ordinary fire brick which lies behind the inner non-spalling brick.

Other advantages of the invention will become apparent as the following description of certain present preferred embodiments thereof proceeds.

In the accompanying drawings we have shown certain present preferred embodiments wherein Figure 1 is a perspectvie view of a furnace arch;

Figure 1:
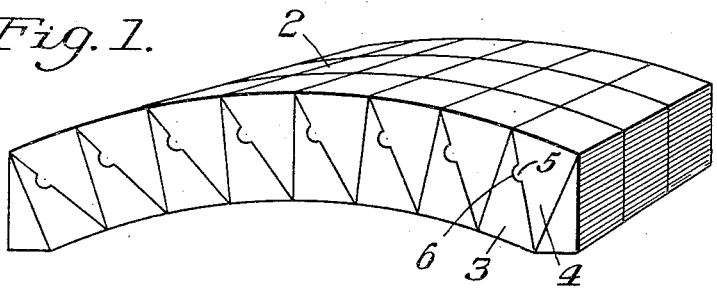

Referring more particularly to the drawings, reference numeral 2 designates generally a furnace arch made up of composite bricks each having a portion 3 of relatively non-spalling material and a portion 4 of ordinary refractory material. The portions 3 and 4 are joined along surfaces extending generally diagonally of the bricks and also extending back at an angle from the lower surface of the arch. The portions 4 are provided with projections 5 fitting into recesses 6 in the portions 3 to assist in locking the portions together and preventing relative movement thereof along the surfaces of juncture due to the pressure exerted thereon by the weight of the structure. The portions 3 cover substantially the entire lower face of the arch, thus protecting the portions 4 and preventing them from spalling.

The portions 3 are of greater thermal conductivity than the portions 4 and conduct the heat of the furnace well into the wall. The temperature gradient is comparatively steep as compared with that in a wall of ordinary refractory material but is much less so than that in a wall made up entirely of non-spalling super-refractory. On account of the fact that portions of each material project well into the body of the wall structure composed predominantly of the other material, the isothermal or cleavage planes are irregularly arranged and the tendency towards spalling thus greatly reduced.

Figure 2:
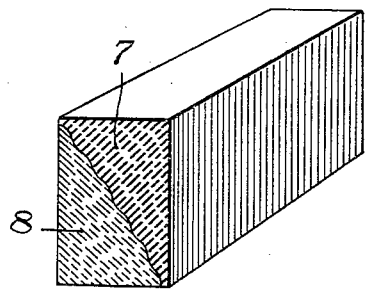
Figure 2 is a perspective view of a composite brick.

In Figure 2 is shown a composite brick made up of a portion 7 of relatively non-spalling material and a portion 8 of ordinary refractory material. The portions 7 and 8 are joined along a surface extending generally diagonally of the brick. The surface of juncture is wavy to reduce to a certain extent the possibility of relative movement between the respective portions of the brick under pressure. The brick may be molded and fired to form the composite structure as a unit, or the respective portions thereof may be fired separately and suitably bonded together.

Figure 3:
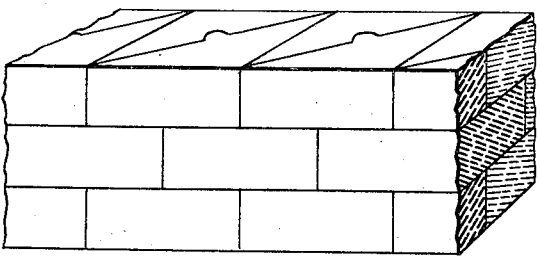
Figure 3 is a perspective view of a portion of a furnace wall.

In Figure 3 is shown a portion of a furnace wall made up of a composite structure. The portions of the bricks facing the interior of the wall are of relatively non-spalling material and the portions facing in the opposite direction are of ordinary refractory material. The joints between the bricks are staggered in the vertical direction.

Figure 4:
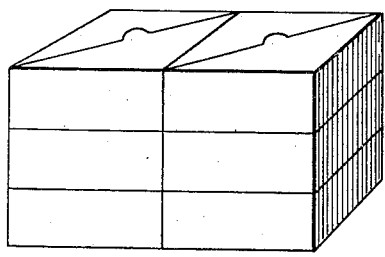
Figure 4 is a perspective view of a portion of a furnace wall structure somewhat different from that shown in Figure 3.
Figure 5:
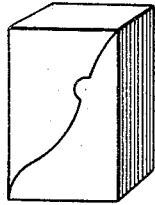
Figures 5, 6, 7 and 8 are perspective views of modifications of the invention.
Figure 6:
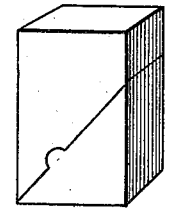

In Figure 4 is shown a structure similar to that of Figure 3 but wherein the joints are not staggered in a vertical direction. This provides for columns of the relatively non-spalling material which, as above stated, also has greater structural strength than the ordinary refractory material, such columns extending from top to bottom of the furnace and assisting in supporting it. On the other hand, the isothermal surfaces are broken up to a greater extent in the construction shown in Figure 3 so that in such a structure there is less tendency toward spalling.

Figures 5, 6, 7 and 8 show optional forms which the invention may assume. In all of such forms the surfaces of juncture between the respective portions of the brick extend generally diagonally thereof.

Figure 9:
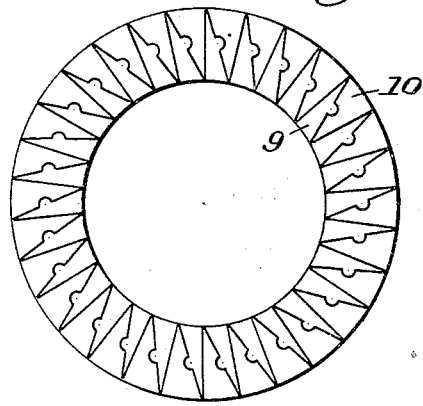
Figure 9 is a top plan view of a crucible furnace lining.
Figure 7:
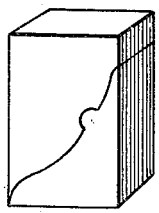
Figure 8:
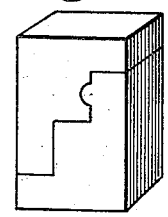

In Figure 9 is shown a crucible furnace lining made up of composite bricks. Each of these bricks comprises an inner portion 9 of relatively non-spalling material and an outer portion 10 of ordinary refractory material. The invention as applied to a crucible lining such as that shown in Figure 9 has peculiar advantages. It has not been practicable heretofore to employ crucible furnace linings made up entirely of super-refractory or non-spalling material on account of the tremendous heat loss through the walls, resulting in a great waste of fuel and over-heating of the surrounding air in the foundry, resulting in uncomfortable working conditions. It has not proved practicable to employ a highly refractory facing with an insulating backing in such a furnace because within the limited space available, the highly refractory lining must be made so thin that it does not possess adequate mechanical strength. By the use of the composite structure shown in Figure 9, such a furnace may be lined at a little more than half the cost of a highly refractory lining with insulation afforded by the ordinary refractory material which prevents an excessive heat loss through the lining.

The bricks may be made in various shapes other than the usual rectangular brick shapes, and we intend the term "brick" to include various shapes. It is usually desired that the refractory furnace wall shall not conduct too much heat, and for this reason it is preferable to have the outer part of the wall made up of relatively poor heat conducting material. Also the material of the heat conducting portions is usually more expensive than that of the ordinary refractory material, and for that reason a large percentage of ordinary refractory material is preferred.

The relatively highly refractory or non-spalling material is preferably silicon carbide, although other materials or mixtures of silicon carbide and other materials may also be used. When the respective portions of the refractory structure are bonded together, a clay bond has been found to be quite satisfactory, although other suitable bonding agents may be used.

When a furnace wall constructed as above described has been in use for a considerable period of time, the inner surface of comparatively non-spalling material will ultimately wear away and spall off. Owing to the fact that the ordinary refractory material lying behind the comparatively non-spalling material has wedge shaped portions extending toward the inner surface of the furnace wall, only small portions of such material will be subjected to the direct action of the intense heat within the furnace. The tendency of such portions to spall and drop into the furnace is reduced by reason of the wedging action exerted by the gradually diminishing body of comparatively non-spalling material at the inside of the lining. Consequently, spalling will not occur at a substantially greater rate than the rate of spalling of the highly refractory material even though small areas of the ordinary refractory material may become subjected directly to the furnace heat. The rate of spalling will increase somewhat as the proportion of comparatively non-spalling material decreases, but the wedging effect of such material upon the ordinary refractory material is maintained as the wall wears.

A composite brick has heretofore been known which comprises a portion of ordinary refractory material and a portion of comparatively non-spalling material joined along a plane generally parallel to a face of the brick and intended to be disposed generally parallel to the inner face of the completed furnace wall. Such brick, however, have been found unsatisfactory on account of the high rate of spalling due to the fact that the isothermal or cleavage planes are substantially continuous and extend generally in the same direction parallel to the inner face of the furnace wall, and also due to the fact that the isothermal planes, being generally parallel to the planes of juncture of the respective materials of which the brick are made, have a tendency to coincide with such planes of juncture. Portions of the outer layer of the wall spall off comparatively quickly under these conditions, which, among others, it is a purpose of the present invention to obviate. While a superficial resemblance exists between the two brick structures composed of different materials joined together, yet their functions are quite the opposite, the one serving to prevent the condition brought about by reason of the construction of the other.

While we have shown and described certain present preferred embodiments of the invention, it is to be distinctly understood that the same is not limited thereto but may be otherwise variously embodied within the scope of the following claims.

We claim:

1. A refractory structure comprising materials of different degrees of susceptibility to spalling, one face of the structure being predominantly of material of relatively less susceptibility to spalling, the ratio of such material to material of relatively greater susceptibility to spalling decreasing progressively and substantially continuously throughout a substantial portion of the structure in the direction of its depth.

2. A refractory structure comprising materials of different thermal conductivities, one face of the structure being predominantly of material of higher thermal conductivity, the ratio of such material to material of lower thermal conductivity decreasing progressively and substantially continuously throughout a substantial portion of the structure in the direction of its depth.

3. A refractory structure having one face predominantly of one material and the opposite face predominantly of another material, the ratio of the first mentioned material to the second mentioned material decreasing progressively and substantially uniformly in the direction of the depth of the structure.

4. A refractory structure having one face predominantly of one material, the structure being comprised of such material and another material relatively more susceptible to spalling, the ratio of the first mentioned material to the second mentioned material decreasing progressively and substantially continuously throughout a substantial portion of the structure in the direction of its depth.

5. A refractory structure comprising materials of different thermal conductivities, one material being disposed predominantly in the vicinity of one face of the structure and extending a substantial distance through the structure in the direction of its depth, the ratio of such material to another material decreasing in the direction of the depth of the structure substantially from face to face.

6. A composite brick comprising portions of different thermal conductivities joined along a surface extending generally diagonally of the brick from adjacent one corner to adjacent the opposite corner.

7. A composite brick comprising portions of different thermal conductivities joined along an irregular surface extending generally from the vicinity of one corner of the brick to the vicinity of the opposite corner thereof.

8. A composite brick comprising portions of different thermal conductivities joined along a surface extending generally from the vicinity of a corner of the brick to the vicinity of the opposite corner, and means to interlock such portions.

9. A composite solid brick comprising a face predominantly of one material, such material becoming less in proportion to another material in the direction of the depth of the brick from such face substantially continuously throughout a substantial portion thereof.

10. A refractory structure comprising portions of different refractory materials molded together, the relative proportions of such materials in the direction of the depth of the structure varying substantially continuously.

11. A refractory structure comprising generally similar integral generally tapered elements of different refractory materials connected together.

12. A refractory structure comprising a pair of integral elements of different refractory materials connected together, the cross-sectional area of one material increasing and that of the other material decreasing with respect to one dimension of the structure.

In testimony whereof we have hereunto set our hands.

FRANCIS L. ARENSBERG.
ARTHUR J. JACKMAN.